US007801921B2

(12) United States Patent
Gillespie

(10) Patent No.: US 7,801,921 B2
(45) Date of Patent: Sep. 21, 2010

(54) DELETION OF DATA FROM CHILD TABLES WITH MULTIPLE PARENTS

(75) Inventor: Allan E. Gillespie, Danville, CA (US)

(73) Assignee: International Business Machines Corporation, Armonk, NY (US)

( * ) Notice: Subject to any disclaimer, the term of this patent is extended or adjusted under 35 U.S.C. 154(b) by 523 days.

(21) Appl. No.: 11/557,927

(22) Filed: Nov. 8, 2006

(65) Prior Publication Data

US 2008/0126367 A1    May 29, 2008

(51) Int. Cl.
G06F 7/00 (2006.01)
(52) U.S. Cl. .................................. 707/796; 707/803
(58) Field of Classification Search .................. None
See application file for complete search history.

(56) References Cited

U.S. PATENT DOCUMENTS

| | | | | |
|---|---|---|---|---|
| 5,185,885 | A * | 2/1993 | Dysart et al. ................. | 707/100 |
| 5,546,576 | A * | 8/1996 | Cochrane et al. ................ | 707/2 |
| 5,987,472 | A * | 11/1999 | Serafin ..................... | 707/104.1 |
| 5,995,961 | A * | 11/1999 | Levy et al. ...................... | 707/4 |
| 6,484,181 | B2 | 11/2002 | Attaluri et al. | |
| 6,665,654 | B2 | 12/2003 | Broden et al. | |
| 7,143,108 | B1 * | 11/2006 | George ..................... | 707/104.1 |
| 2002/0095408 | A1 | 7/2002 | Cheng | |
| 2003/0028545 | A1 * | 2/2003 | Wang et al. .................. | 707/100 |
| 2003/0065671 | A1 | 4/2003 | Cardenas | |
| 2003/0200219 | A1 | 10/2003 | Wang et al. | |
| 2004/0111410 | A1 | 6/2004 | Burgoon et al. | |
| 2005/0050069 | A1 | 3/2005 | Vaschillo et al. | |
| 2005/0240843 | A1 * | 10/2005 | Steinmann et al. .......... | 714/724 |
| 2005/0283485 | A1 * | 12/2005 | Blaicher et al. ............. | 707/100 |
| 2006/0004745 | A1 | 1/2006 | Kuhn et al. | |
| 2006/0026154 | A1 * | 2/2006 | Altinel et al. .................. | 707/5 |
| 2006/0047717 | A1 | 3/2006 | Pereira | |
| 2006/0123023 | A1 * | 6/2006 | Manolov .................... | 707/100 |
| 2006/0149796 | A1 * | 7/2006 | Aalmink .................... | 707/204 |
| 2007/0083573 | A1 * | 4/2007 | Gillespie .................... | 707/204 |

(Continued)

OTHER PUBLICATIONS

Bornhövd, et al. "Adaptive Database Caching with DBCache", IEEE Data Engineering Bulletin, 27(2): Jun. 11-18, 2004.*

(Continued)

*Primary Examiner*—Neveen Abel Jalil
*Assistant Examiner*—Vei-Chung Liang
(74) *Attorney, Agent, or Firm*—Samuel K. Simpson; Patent Ingenuity, P.C.

(57) ABSTRACT

A method, computer program product, and system delete a row from a child table. The method, computer program product, and system delete the requested child row from the child table if the query corresponds to each of the plurality of parent tables and each of the plurality of parent tables has a row with a linked parent column that has a same value as a linked child column in the requested child row from the child table. Alternatively, deletion is performed if the query corresponds to only one of the plurality of parent tables having a row with a linked parent column that has a same value as a linked child column in the requested row from the child table and, for each remaining parent table, no row has a linked column that has a same value as a linked column in the requested row from the child table.

11 Claims, 5 Drawing Sheets

U.S. PATENT DOCUMENTS

2007/0276779 A1* 11/2007 Baker et al. .................... 707/1

OTHER PUBLICATIONS

Türker et al., Semantic integrity support in SQL:1999 and commercial (object-) relational database management ssystems, The VLDB Journal, 10:241-269 (20001).*

Bornhövd, et al. "Adaptive Database Caching with DBCache", IEEE Data Engineering Bulletin, 27(2): Jun. 11-18, 2004.*

Türker et al., Semantic integrity support in SQL:1999 and commercial (object-) relational database management ssystems, The VLDB Journal, 10:241-269 (20001).*

* cited by examiner

DELETION OF DATA FROM CHILD TABLES WITH MULTIPLE PARENTS

FIELD OF THE INVENTION

The present invention relates generally to database systems. More particularly, the present invention is directed to deletion of data from child tables with multiple parents.

BACKGROUND OF THE INVENTION

Data in database systems are stored in tables organized into rows and columns. A table may be related to another table via a parent-child relationship. For example, a company may have a table that stores customer information and another table that stores invoice information. A relationship can be formed between the two tables by linking, for instance, a customer identifier column in the customer table to a customer identifier column in the invoice table.

When a child table has more than one parent table, deletion of data in the child table can become problematic because in order to maintain data integrity, data in the child table can only be deleted if it is not related to another parent table. As an example, if the company above also had a third table that stores parts information and a relationship is formed between the parts table and the invoice table by linking, for instance, a part identifier column in the parts table to a part identifier column in the invoice table, deletion of data concerning a part from the parts table should not automatically lead to deletion of data concerning an invoice for the part because data concerning the invoice may also be linked to data concerning a customer in the customer table.

One way to address the problem is to employ rules or constraints in such a way as to prevent data in a child table from being deleted if the data is also related to data in another parent table. Employing rules or constraints, however, require additional database definitional work with respect to the tables involved and result in additional performance overhead when the rules or constraints are checked. Additionally, each application seeking to access the child table is impacted by the rule checking regardless of whether or not the application requires the rules or constraints to be enforced.

Extensive error checking code is also required in applications to keep track of the rules that have failed and the rules that have succeeded. For those rules that have failed, a rollback operation has to be performed to restore the data previously deleted. Moreover, database standards and/or application programming standards in some environments disallow usage of rules or constraints.

Accordingly, there is a need to provide a method for deleting data in child tables with multiple parents without employing rules or constraints.

SUMMARY OF THE INVENTION

A method, computer program product, and system for deleting data from a child table with a plurality of parent tables are provided. The method, computer program product, and system provide for deleting data from the child table that is qualified by each parent table and deleting data from the child table that is qualified by only one parent table and is not related to data from any other parent table.

DETAILED DESCRIPTION

The present invention relates generally to database systems and more particularly to deletion of data from child tables with multiple parents. The following description is presented to enable one of ordinary skill in the art to make and use the invention and is provided in the context of a patent application and its requirements. Various modifications to the preferred implementations and the generic principles and features described herein will be readily apparent to those skilled in the art. Thus, the present invention is not intended to be limited to the implementations shown, but is to be accorded the widest scope consistent with the principles and features described herein.

When running applications against data in database environments, data is oftentimes operated on as groups of related data. These groups are typically defined by how tables containing the data are related to one another. In groups of related tables, there are parent tables and child tables. Parent tables are tables that are related to another table where the relationship extends from the parent to the child.

Figure 1:
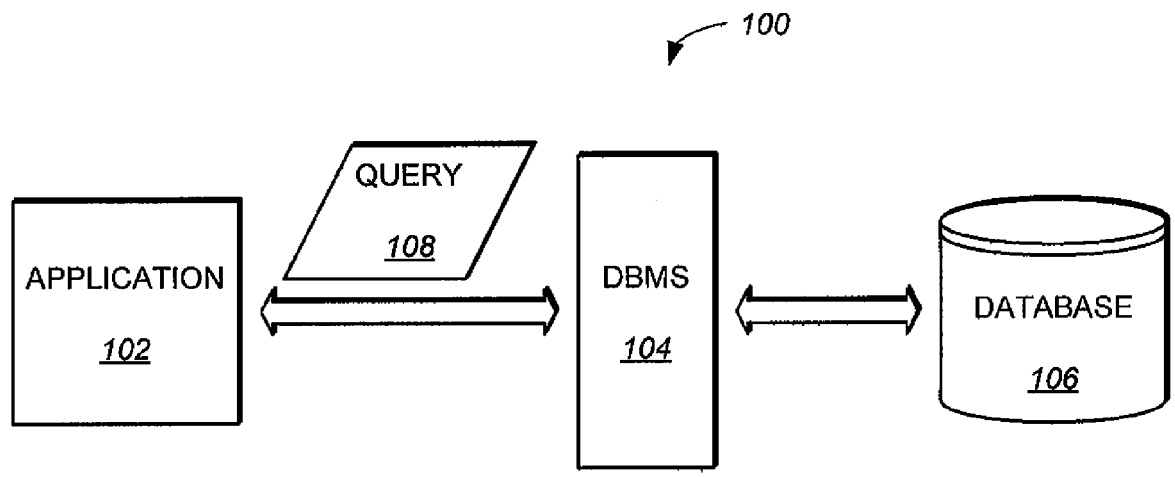
FIG. 1 is a system in accordance with an implementation of the invention.

FIG. 1 illustrates a system 100 with an application 102, a database management system (DBMS) 104, and a database 106. Stored in database 106 is a plurality of tables. DBMS 104 is operable to control access to and manipulation of data stored in database 106. As seen in FIG. 1, application 102 is in communication with DBMS 104 and is submitting a query 108 against one or more of the plurality of tables stored in database 106. Query 108 may be seeking to retrieve, modify, and/or delete one or more rows from a table in database 106. Query 108 may be written in structured query language (SQL) or other database query languages.

Some applications, such as archiving applications, use a parent table to qualify data in a child table in order to copy the qualified data to another storage location, then delete the archived data from the parent and child tables. In one implementation, a row of a child table is qualified by a parent table when a column in the row of the child table and a related column in a row of the parent table have the same value and the row of the parent table satisfies a query on the parent table. The query may be from an application, such as an archiving application.

Figure 2:
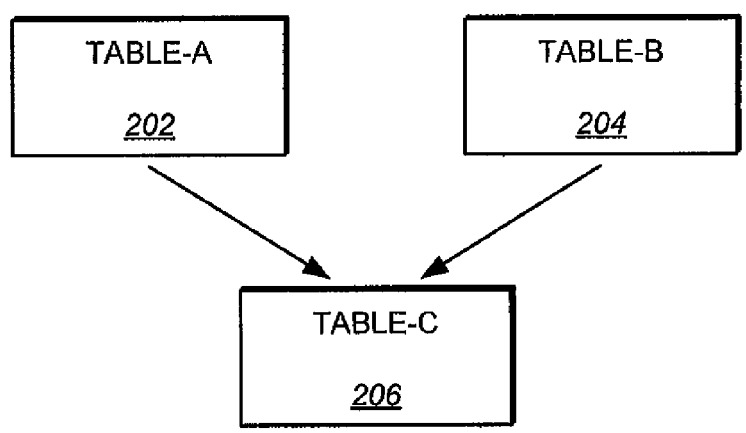
FIG. 2 illustrates an example of parent-child relationships between tables according to an implementation of the invention.

Depicted in FIG. 2 is an example concerning three tables, Table-A 202, Table-B 204, and Table-C 206. As seen from FIG. 2, Table-C 206 has two parent tables, Table-A 202 and Table-B 204, Assume, for instance, each of the tables in FIG. 2 includes two columns—C1 and C2. Assume also that column C1 in Table-A 202 is related to column C1 in Table-C 206 and that column C2 in Table-B 204 is related to column C2 in Table-C 206. If a query requests every row in Table-A 202 where C1=x, then each row in Table-C 206 where C1=x is a row qualified by Table-A 202 and will be returned along with each row in Table-A 202 where C1=x.

When a child table has multiple parent tables, as with Table-C 206 in FIG. 2, a special situation arises when deleting data from the child table because the child table is qualified by different parents, i.e., each parent qualifies a set of data in the child. Data sought to be deleted by an application can be defined as the intersection of all qualified sets plus the data qualified by each parent that does not exist in the intersection. To put it another way, the data subject to deletion can be thought of as the union of all qualified sets minus any duplicates in the intersection.

When deleting qualified sets of data from a child table with multiple parents, special considerations have to be made not to delete data related to one parent if the data is also related to data in another parent that is not being deleted by the application. Deleting the data could lead to inconsistencies in the overall data. In addition, other applications may not be able to locate data that have been improperly deleted and consequently, inaccurate results may be returned.

Figure 3:
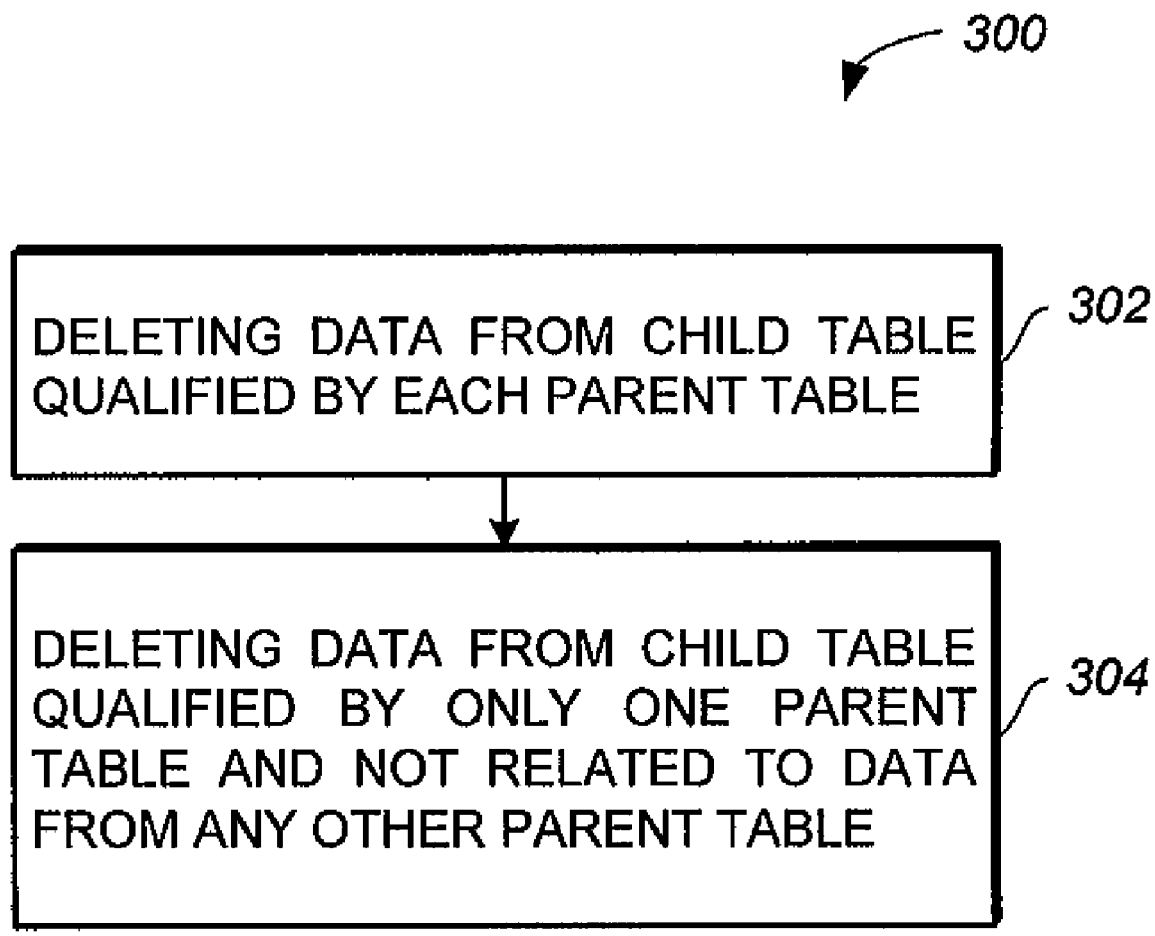
FIG. 3 depicts a flowchart of a method for deleting data from a child table with a plurality of parents in accordance with an implementation of the invention.

FIG. 3 shows a process 300 for deleting data in a child table with a plurality of parent tables according to an implementation of the invention. At 302, data from the child table that is qualified by each parent table is deleted. Data from the child table that is qualified by only one parent table and is not related to data from any other parent table is deleted at 304.

Figure 4:
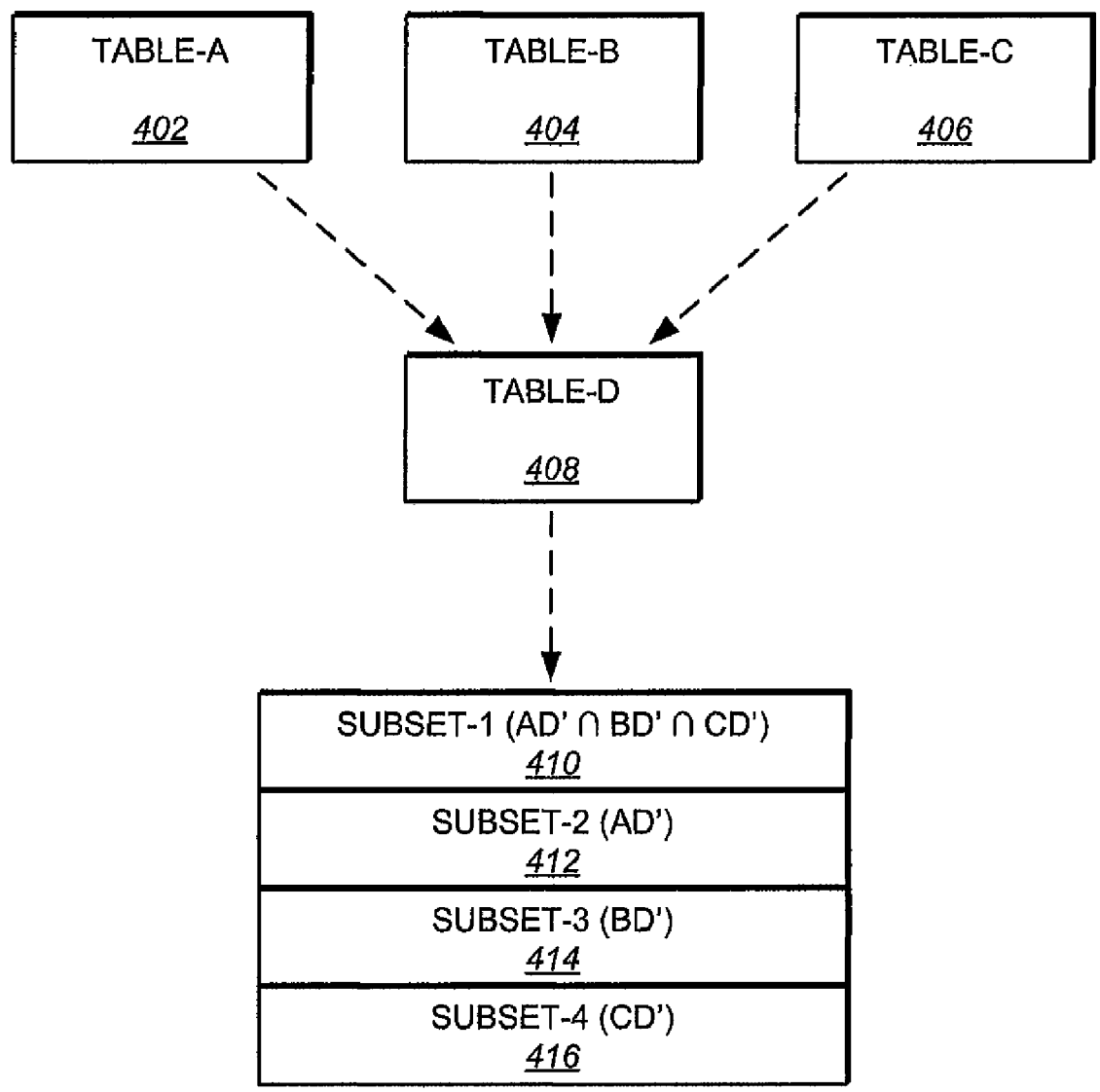
FIG. 4 shows an example of subsets of data in a child table according to an implementation of the invention.

To help illustrate, four tables, Table-A 402, Table-B 404, Table-C 406, and Table-D 408, are depicted in FIG. 4. As seen in FIG. 4, Table-D 408 is a child table with three parent tables. In order to find out whether any data in child Table-D 408, which is qualified by data in at least one of the parent tables 402-406 that an application seeks to delete, can be safely deleted by the application without breaking any relationship to data in one of the parent tables 402-406 that is not sought by the application, a determination is made as to whether a set of data in child Table-D 408 that is qualified by data in at least one of the parent tables 402-406 sought by the application, which is denoted as D' in FIG. 4, includes a subset of data qualified by each of the parent tables, Table-A 402, Table-B 404, and Table-C 406.

A Subset-1 410 representing the intersection of data in child Table-D 408 qualified by parent Table-A 402 (AD'), data in child Table-D 408 qualified by parent Table-B 404 (BD'), and data in child Table-D 408 qualified by parent Table-C 406 (CD') is depicted in FIG. 4. Thus, Subset-1 410 includes data in child Table-D 408 qualified by each of the parent tables 402-406. This subset of data can be deleted from child Table-D 408 because none of the data in the subset has a relationship to data in a parent table that the application is not seeking to delete.

FIG. 4 also depicts a Subset-2 412, which represents data in child Table-D 408 qualified solely by parent Table-A 402, a Subset-3 414, which represents data in child Table-D 408 qualified solely by parent Table-B 404, and a Subset-4 416, which represents data in child Table-D 408 qualified solely by parent Table-C 406. Before deleting data in one of the subsets 412-416, a determination is made as to whether data in the subset is related to data in one of the other parent tables not qualifying the data in the subset.

In one implementation, a row in a child table is related to a row in a parent table when a column in the row of the child table and a related column in the row of the parent table have the same value. For instance, assume that each of tables 402-408 has three columns, C1, C2, and C3, and that parent Table-A 402 and child Table-D 408 are related by column C1, parent Table-B 404 and child Table-D 408 are related by column C2, and parent Table-C 406 and child Table-D 408 are related by column C3. Hence, with respect to Subset-2 412, to determine whether a row in Subset-2 412 of child Table-D 408 is related to a row in parent Table-B 404 or parent Table-C 406, the value in column C2 of the row in Subset-2 412 can be compared to column C2 values in Table-B 404 to determine if there is a match, and the value in column C3 of the row in Subset-2 412 can be compared to column C3 values in Table-C 406 to determine if there is a match.

A row in Subset-2 412 can be deleted from child Table-D 408 if it is not related to a row in parent Table-B 404 or parent Table-C 406. A row in Subset-3 414 can be deleted from child Table-D 408 if it is not related to a row in parent Table-A 402 or parent Table-C 406. A row in Subset-4 416 can be deleted from child Table-D 408 if it is not related to a row in parent Table-A 402 or parent Table-B 404. This ensures that the data deleted from child Table-D 408 data will not include data that may be accessed by another application.

Child Table-D 408 may also have additional subsets of data (not shown) that are qualified by two of the parent tables 402-406. These subsets of data, however, cannot be safely deleted from child Table-D 408 because a row in one of these subsets of data may be related to a row in a qualifying parent table that is not being sought by the application, i.e., the row in child Table-D 408 is, for instance, qualified by a row in parent Table-A 402 and a row in parent Table-B 404, and related to another row in parent Table-A 402 that is a non-qualifying row (i.e., a row that the application is not seeking to delete).

The above methodology can be generalized to a case where a child table C ahs a set of data C' sought by an application and parent tables A to n. To delete data from child table C:

Determine AC', . . . , nC' in C'

Determine whether AC', . . . , nC' exists in C'

Delete data in AC', . . . , nC' from C

Delete data in nC' from C if it is not related to data in parent tables of C other than parent table n Data is represented in tables as rows of data with columns of information. As discussed above, tables may be related to one another by specifying a column in one table and relating it to a column in another table. The relationship can be described as a tuple and represented as {A.c1, B.c1}, where A.c1 is a column 'c1' in a table 'A' that is related to B.c1, which is a column 'c1' in a table 'B'.

Figure 5:
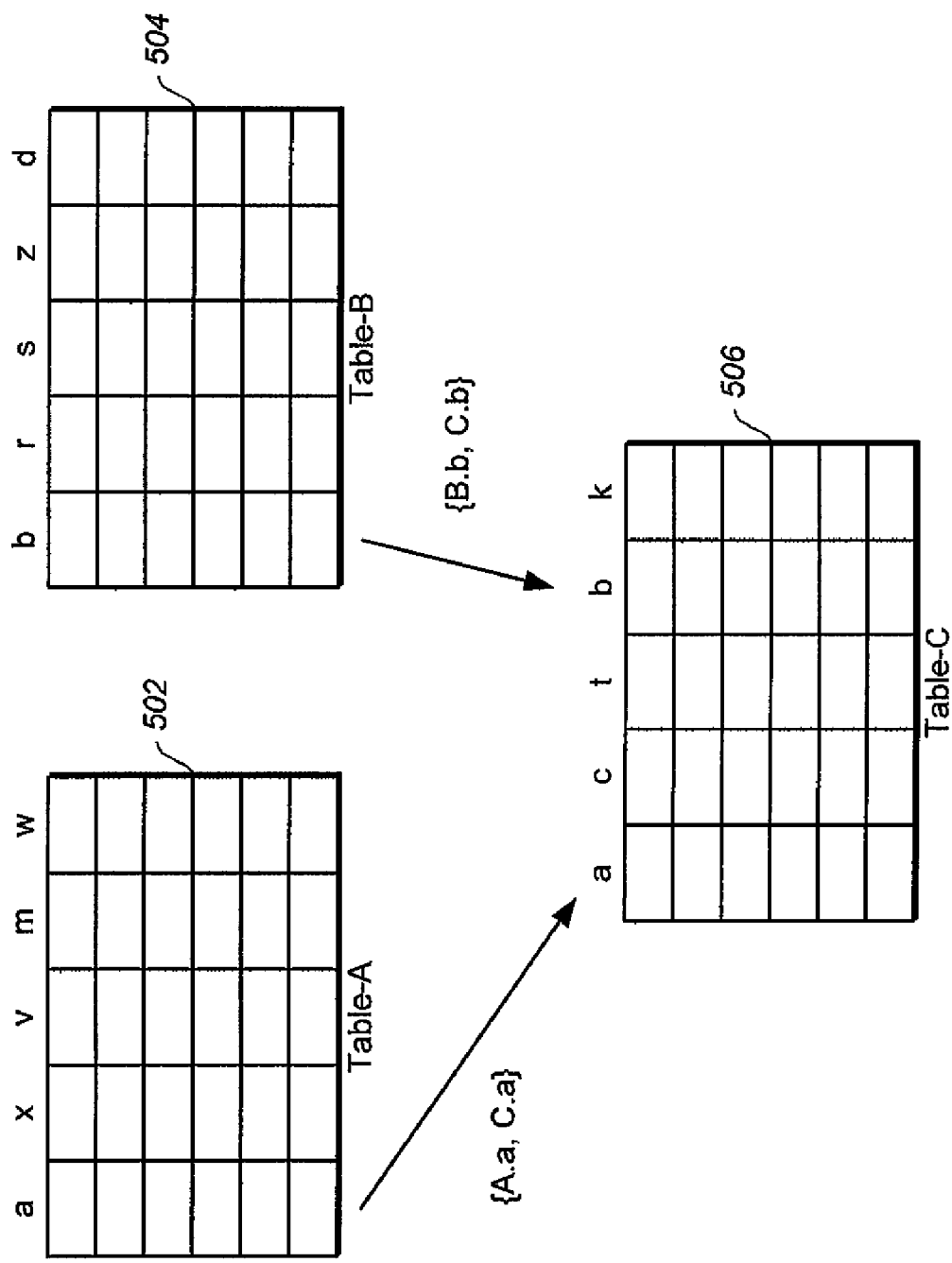
FIG. 5 illustrates an example of links between columns of parent and child tables in accordance with an implementation of the invention.

FIG. 5 illustrates an exmaple of a child Table-C 506 with a parent Table-A 502 and a parent Table-B 504. In the example of FIG. 5, a relationship exists between column 'a' in Table-A 502 and column 'a' in Table-C 506, depicted as {A.a, C.a} in FIG. 5. A relationship also exists between column 'b' in Table-B 504 and column 'b' in Table-C 506, depicted as {B.b, C.b} in FIG. 5. Using the examples and relationship principles described above, a delete methodology can be expressed as the following:

{C.a, C.b} is an element of C' if an only if (A.a=C.a) or (B.b=C.b)

{C'.a, C'.b} is an element of AC' intersection BC' if an only if {AC'.a, AC'.b}={BC'.a, BC'.b}

If {C'.a, C'.b} is an element of AC' intersection BC', delete {C'.a, C'.b} from C If ({C'.a, C'.b} is an element of C') and ({C'.a, C'.b} is not an element of AC' intersection BC') and (for every C'.b where {A.a, C'.a} is not an element of A or for every C'.a where {B.b, C'.b} is not an element of B), delete {C'.a, C'.b} from C.

C' is a set of data in child Table-C 506 sought by an application. The set of data in Table-C 506 sought by the application may be less than all of the data in child Table-C 506.

The invention can take the form of an entirely hardware implementation, an entirely software implementation, or an implementation containing both hardware and software elements. In one aspect, the invention is implemented in software, which includes, but is not limited to, firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk—read-only memory (CD-ROM), and compact disk—read/write (CD-R/W).

Figure 6:
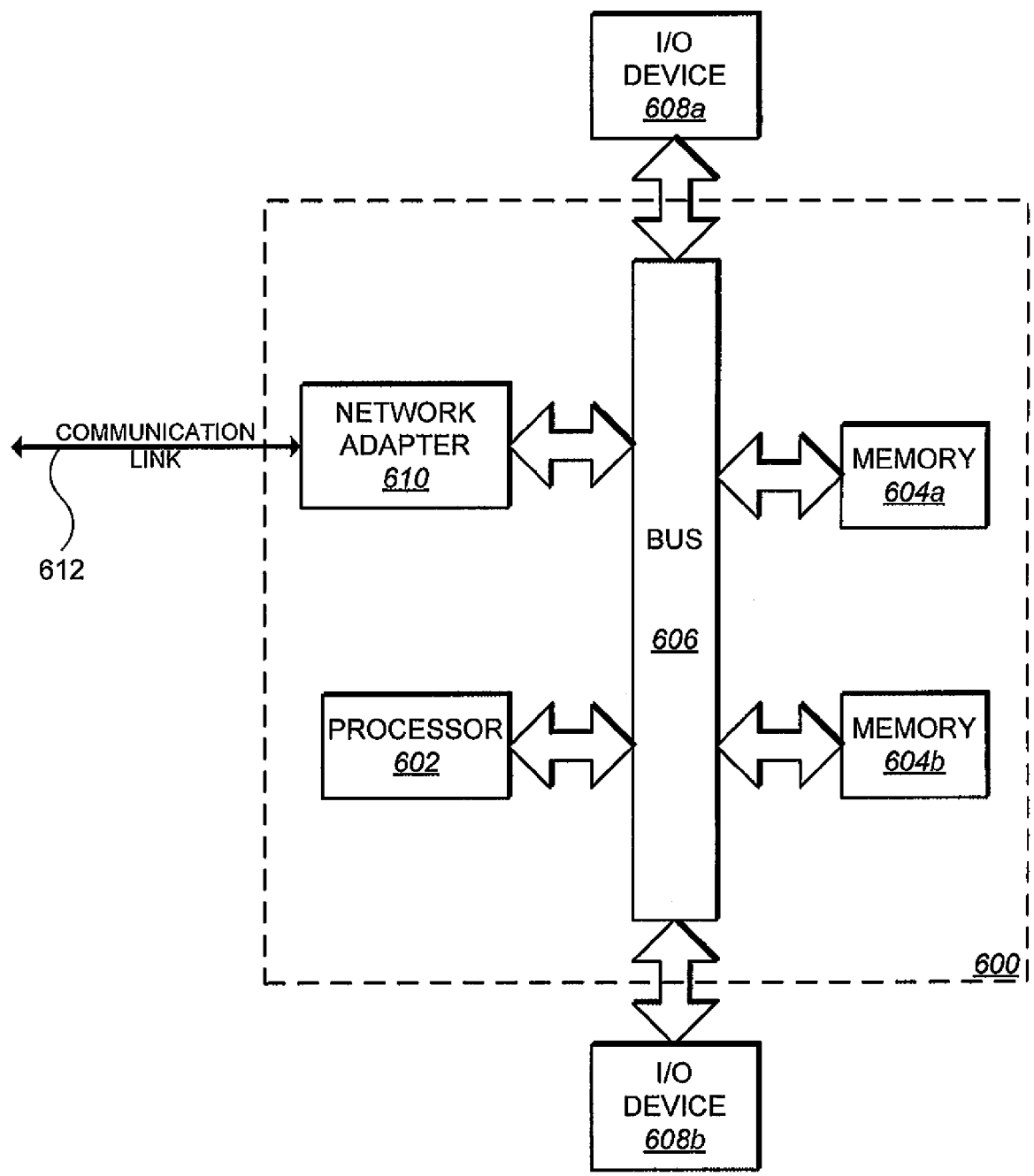
FIG. 6 depicts a block diagram of a data processing system with which implementations of the invention can be implemented.

Shown in FIG. 6 is a data processing system 600 suitable for storing and/or executing program code. Data processing system 600 includes a processor 602 coupled to memory elements 604*a-b* through a system bus 606. In other implementations, data processing system 600 may include more than one processor and each processor may be coupled directly or indirectly to one or more memory elements through a system bus.

Memory elements 604*a-b* can include local memory employed during actual execution of the program code, bulk storage, and cache memories that provide temporary storage of at least some program code in order to reduce the number of times the code must be retrieved from bulk storage during execution. As shown, input/output or I/O devices 608*a-b* (including, but not limited to, keyboards, displays, pointing devices, etc.) are coupled to data processing system 600. I/O devices 608*a-b* may be coupled to data processing system 600 directly or indirectly through intervening I/O controllers (not shown).

In the implementation, a network adapter 610 is coupled to data processing system 600 to enable data processing system 600 to become coupled to other data processing systems or remote printers or storage devices through communication link 612, Communication link 612 can be a private or public network. Modems, cable modems, and Ethernet cards are just a few of the currently available types of network adapters.

By performing an existence check for relationships to a parent table before deleting a row in a child table, integrity of data in the child table can be assured without having to implement rules or constraints in a database management system. In addition, the methodologies described above can be implemented independent of the database management system and only in those applications that require data consistency to be maintained. Hence, all applications are not impacted as with the rules approach. Further, there is no need for complex error checking, nor is there a dependency on rollback to restore previously deleted data.

While various implementations for deleting data from child tables with multiple parents have been described, the technical scope of the present invention is not limited thereto. It is to be understood by those skilled in the art that various modifications or improvements can be added to the above implementations. It is apparent from the appended claims that such modified or improved implementations fall within the technical scope of the present invention

What is claimed is:

1. A method comprising:
   (a) linking, with a computer, a child table and a plurality of parent tables in a database such that, for each of the plurality of parent tables, the child table has a linked child column that is linked to a linked parent column;
   (b) receiving a query for information corresponding to at least one of the plurality of parent tables;
   (c) receiving a request to delete a requested child row from the child table;
   (d) determine a first condition, the first condition being that the query corresponds to each of the plurality of a parent table and each of the plurality of parent tables has a row with a linked parent column that has a same value as a linked child column in the requested child row from the child table;
   (e) deleting the requested child row from the child table upon the first condition being met; and
   (f) determining a second condition, the second condition being that the query corresponds to only one of the plurality of parent tables that has a row with a linked parent column that has a same value as a linked child column in the requested row from the child table and, for each remaining parent table, no row has a linked column has a same value as a linked column in the requested row from the child table; and
   (g) deleting the requested child row from the child upon the second condition being met.

2. The method of claim 1, further comprising deleting, for each of the plurality of parent tables that has the row with the linked parent column that has the same value as the linked child column in the requested child row from the child table, the row with the linked parent column that has the same value as the linked child column in the requested child row from the child table upon the requested child row being deleted.

3. The method of claim 1, wherein the query is from an application.

4. The method of claim 1, wherein the query is a structured query language (SQL) statement.

5. A system comprising:
   a database that stores a child table and a plurality of parent tables of the child table;
   a database management system having a computer that controls access to and manipulation of data stored in the database; and
   an application in communication with the database management system, wherein the application
   (a) links, with the computer, a child table and a plurality of parent tables in a database such that, for each of the plurality of parent tables, the child table has a linked child column that is linked to a linked parent column;
   (b) receives a query for information corresponding to at least one of the plurality of parent tables;
   (c) receives a request to delete a requested child row from the child table;
   (d) determines a first condition, the first condition being that the query corresponds to each of the plurality of parent tables and each of the plurality of parent tables has a row with a linked parent column that has a same value as a linked child column in the requested child row from the child table;

(e) deletes the requested child row from the child table upon the first condition being met; and (f) determines a second condition, the second condition being that the query corresponds to only one of the plurality of parent tables that has a row with a linked parent column that has a same value as a linked child column in the requested row from the child table and, for each remaining parent table, no row has a linked column that has a same value as linked column in the requested row from the child table; and (g) deletes the requested child row from the child table upon the second condition being met.

6. The system of claim 5, wherein the application deletes, for each of the plurality of parent tables that has the row with the linked parent column that has the same value as the linked child column in the requested child row from the child table, the row with the linked parent column that has the same value as the linked child column in the requested child row from the child table upon the requested child row being deleted.

7. The system of claim 5, wherein the query is from an application.

8. A computer program product comprising a computer readable storage medium, the computer readable storage medium including a computer readable program for deleting data from a child table with a plurality of parent tables, wherein the computer readable program when executed on a computer causes the computer to:

(a) link, with a computer, a child table and a plurality of parent tables in a database such that, for each of the plurality of parent tables, the child table has a linked child column that is linked to a linked parent column;

(b) receive a query for information corresponding to at least one of the plurality of parent tables;

(c) receive a request to delete a requested child row from the child table;

(d) determine a first condition, the first condition being that the query corresponds to each of the plurality of parent tables and each of the plurality of parent tables has a row with a linked parent column that has a same value as a linked child column in the requested child row from the child table;

(e) delete the requested child row from the child table upon the first condition being met; and (f) determine a second condition, the second condition being that the query corresponds to only one of the plurality of parent tables that has a row with a linked parent column that has a same value as a linked child column in the requested row from the child table and, for each remaining parent table, no row has a linked column that has a same value as a linked column in the requested row from the child table; and (g) delete the requested child row from the child table upon the second condition being met.

9. The computer program product of claim 8, wherein the computer readable program when executed on the computer further causes the computer to delete, for each of the plurality of parent tables that has the row with the linked parent column that has the same value as the linked child column in the requested child row from the child table, the row with the linked parent column that has the same value as the linked child column in the requested child row from the child table upon the requested child row been deleted.

10. The computer program product of claim 8, wherein the query is from an application.

11. The computer program product of claim 8, wherein the query is a structured query language (SQL) statement.

* * * * *